(12) United States Patent
Nomura et al.

(10) Patent No.: US 11,187,129 B2
(45) Date of Patent: Nov. 30, 2021

(54) EXHAUST GAS PURIFICATION CATALYST

(71) Applicants: CATALER CORPORATION, Kakegawa (JP); TOYOTA JIDOSHA KABUSHIKI KAISHA, Toyota (JP)

(72) Inventors: Yasutaka Nomura, Kakegawa (JP); Satoru Inoda, Kakegawa (JP); Naoto Miyoshi, Nagoya (JP); Akemi Sato, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/647,004

(22) PCT Filed: Sep. 11, 2018

(86) PCT No.: PCT/JP2018/033544
§ 371 (c)(1),
(2) Date: Mar. 12, 2020

(87) PCT Pub. No.: WO2019/065206
PCT Pub. Date: Apr. 4, 2019

(65) Prior Publication Data
US 2020/0263587 A1   Aug. 20, 2020

(30) Foreign Application Priority Data
Sep. 28, 2017   (JP) .............................. JP2017-189040

(51) Int. Cl.
*F01N 3/28* (2006.01)
*F01N 3/035* (2006.01)

(52) U.S. Cl.
CPC ........... *F01N 3/2803* (2013.01); *F01N 3/035* (2013.01); *F01N 2370/02* (2013.01); *F01N 2510/0684* (2013.01)

(58) Field of Classification Search
CPC ............ B01D 46/2418; B01D 46/2474; B01D 53/94; B01D 53/9459; B01D 53/9472;
(Continued)

(56) References Cited

U.S. PATENT DOCUMENTS 8,795,617 B2 *   8/2014   Swallow ................... B01J 29/14
                                                  423/213.2
8,802,016 B2 *   8/2014   Grubert ................ B01D 53/944
                                                   422/177
(Continued)

FOREIGN PATENT DOCUMENTS

EP   2 491 999 A1   8/2012
JP   2007-185571 A   7/2007
(Continued)

OTHER PUBLICATIONS

Sep. 15, 2020 Extended Search Report issued in European Patent Application No. 18860962.2.
(Continued)

*Primary Examiner* — Timothy C Vanoy
(74) *Attorney, Agent, or Firm* — Oliff PLC

(57) ABSTRACT

An exhaust gas purification including: a base of wall flow structure having inlet side cells wherein an end on the exhaust gas inflow side is open and outlet side cells wherein an end on the exhaust gas outflow side is open, and a porous partition wall that partitions the side cells; and first and second catalyst layers disposed in the interior of the porous partition wall so as to be in contact with the side cells, wherein either of the catalyst layers contains an oxidation catalyst but does not contain a reduction catalyst, and the other contains the reduction catalyst but does not contain the oxidation catalyst; and a ratio of the lengths of the catalyst layers differs between a surface of the porous partition wall (Continued)

on the side in contact with the inlet side cells and a surface on the side in contact with the outlet side cells.

8 Claims, 4 Drawing Sheets

(58) Field of Classification Search
CPC ........ B01D 2201/62; B01D 2255/9032; B01D 2255/905; B01D 2255/9155; B01D 2258/012; B01J 35/0006; B01J 35/0073; F01N 3/035; F01N 2250/02
See application file for complete search history.

(56) References Cited

U.S. PATENT DOCUMENTS

| | | | |
|---|---|---|---|
| 9,242,212 B2* | 1/2016 | Phillips | B01D 53/9418 |
| 9,611,773 B2* | 4/2017 | Brown | B01J 35/0006 |
| 2008/0020922 A1* | 1/2008 | Li | B01J 23/63 |
| | | | 502/73 |
| 2008/0078171 A1* | 4/2008 | DaCosta | F01N 3/029 |
| | | | 60/297 |
| 2009/0087365 A1 | 4/2009 | Klingmann et al. | |
| 2012/0186229 A1* | 7/2012 | Phillips | B01J 29/072 |
| | | | 60/274 |
| 2014/0227155 A1* | 8/2014 | Phillips | B01J 29/85 |
| | | | 423/212 |
| 2016/0279571 A1 | 9/2016 | Tsuji et al. | |
| 2016/0367941 A1 | 12/2016 | Gilbert et al. | |
| 2017/0232429 A1 | 8/2017 | Aoki | |
| 2017/0298797 A1 | 10/2017 | Onoe et al. | |
| 2018/0021726 A1 | 1/2018 | Onoe et al. | |
| 2018/0028972 A1 | 2/2018 | Kitamura et al. | |
| 2018/0133648 A1 | 5/2018 | Sekine et al. | |

FOREIGN PATENT DOCUMENTS

| | | |
|---|---|---|
| JP | 2009-082915 A | 4/2009 |
| JP | 2009-287402 A | 12/2009 |
| JP | 2012-172597 A | 9/2012 |
| JP | 2016-123890 A | 7/2016 |
| JP | 2017-144377 A | 8/2017 |
| WO | 2014/080220 A1 | 5/2014 |
| WO | 2015/087816 A1 | 6/2015 |
| WO | 2016/060050 A1 | 4/2016 |
| WO | 2016/133085 A1 | 8/2016 |
| WO | 2016/133086 A1 | 8/2016 |
| WO | 2017/163984 A1 | 9/2017 |

OTHER PUBLICATIONS

Mar. 31, 2020 International Preliminary Report on Patentability issued in International Patent Application No. PCT/JP2018/033544.

* cited by examiner

EXHAUST GAS PURIFICATION CATALYST

TECHNICAL FIELD

The present invention relates to an exhaust gas purification catalyst, and more particularly, to an exhaust gas purification catalyst of wall flow type.

The present application claims the benefit of foreign priority to Japanese Patent Application No. 2017-189040, filed 28 Sep. 2017, which is herein incorporated by reference in its entirety.

BACKGROUND ART

Exhaust gas emitted by internal combustion engines such as automobile engines contains harmful components such as hydrocarbons (HC), carbon monoxide (CO), nitrogen oxides ($NO_x$) and particulate matter (PM). Exhaust gas purification catalysts are conventionally used in order to efficiently trap and remove such harmful components and PM from exhaust gas.

Patent Literature 1 and 2 are examples of prior art literature that is relevant to such catalysts. Patent Literature 1 discloses an exhaust gas purification catalyst of wall flow type, provided with: a base of wall flow structure having inlet side cells in which an end on the exhaust gas inflow side is open and outlet side cells in which an end on the exhaust gas outflow side is open and a porous partition wall that partitions the inlet side cells and the outlet side cells, a catalyst layer (Pd-containing layer) that contains palladium (Pd); and a catalyst layer (Rh-containing layer) that contains rhodium (Rh). In the exhaust gas purification catalyst of Patent Literature 1, the Pd-containing layer is provided throughout the interior of the partition wall, and the Rh-containing layer is provided over the whole surface of the partition wall, so as to cover completely the surface of the Pd-containing layer on the side in contact with the inlet side cells. In the exhaust gas purification catalyst of Patent Literature 1, harmful components are purified when the exhaust gas passes through the Pd-containing layer provided in the interior of the partition wall, and/or when the exhaust gas comes in contact with the Rh-containing layer provided on the surface of the partition wall.

CITATION LIST

Patent Literature

Patent Literature 1: Japanese Patent Application Publication No. 2007-185571
Patent Literature 2: Japanese Patent Application Publication No. 2009-082915

SUMMARY OF INVENTION

In the exhaust gas purification catalyst of Patent Literature 1, the Rh-containing layer is disposed so as to cover the whole surface of the partition wall. In consequence, a problem may arise in that the output of the internal combustion engine drops on account of the resulting increase in pressure loss. Exhaust gas regulations and fuel consumption regulations have tended to become yet more stringent in recent years. Accordingly, there is a demand for reductions in pressure loss, and further enhancement of exhaust gas purification performance, in exhaust gas purification catalysts.

In view of the above, it is an object of the present invention to provide an exhaust gas purification catalyst of wall flow type in which reductions in pressure loss as well as enhancement of purification performance on harmful components are both achieved.

The present invention provides an exhaust gas catalyst disposed in an exhaust passage of an internal combustion engine, and that purifies exhaust gas emitted by the internal combustion engine. The exhaust gas purification catalyst includes: a base of wall flow structure having an inlet side cell in which an end on the exhaust gas inflow side is open and an outlet side cell in which an end on the exhaust gas outflow side is open, and a porous partition wall that partitions the inlet side cell and the outlet side cell; a first catalyst layer disposed in the interior of the partition wall, along an extension direction of the partition wall from t the end on the exhaust gas inflow side, so as to be in contact with the inlet side cell and the outlet side cell; and a second catalyst layer disposed in the interior of the partition wall, along the extension direction of the partition wall from the end on the exhaust gas outflow side, so as to be in contact with the inlet side cell and the outlet side cell. Either one of the first catalyst layer and the second catalyst layer contains an oxidation catalyst but does not contain a reduction catalyst, and the other one contains a reduction catalyst but does not contain an oxidation catalyst. A ratio of the lengths of the first catalyst layer and the second catalyst layer differs between a surface of the partition wall on the side in contact with the inlet side cell and a surface of the partition wall on the side in contact with the outlet side cell.

In the exhaust gas purification catalyst, the two catalyst layers are both disposed so as to be in contact with the inlet side cells and outlet side cells, in the interior of the partition wall. The two catalyst layers are respectively disposed from both ends in the extension direction of the partition wall, and are configured so that a ratio of the lengths of the two catalyst layers differs between a surface of the partition wall on the side in contact with the inlet side cells and a surface of the partition wall on the side in contact with the outlet side cells. By arranging the catalyst layers in a distributed manner, it becomes possible as a result to keep wide an exhaust gas flow path within the pores of the partition wall. In addition, the contact frequency of the exhaust gas with the oxidation catalyst and/or reduction catalyst can be increased by arranging the oxidation catalyst and the reduction catalyst in respective separate catalyst layers. In the exhaust gas purification catalyst, it becomes therefore possible to both reduce pressure loss and enhance purification performance on harmful components, at a relatively higher level than in a case for instance where, as in Patent Literature 1, the catalyst has a catalyst layer on the surface of the partition wall, or has a catalyst layer that is not in contact with at least one of the inlet side cells and the outlet side cells.

In a preferred mode of the present invention, the first catalyst layer contains a reduction catalyst but does not contain an oxidation catalyst, and the second catalyst layer contains an oxidation catalyst but does not contain a reduction catalyst. As a result, this allows NOx in exhaust gas to be purified particularly well.

In a preferred mode of the present invention, the first catalyst layer contains an oxidation catalyst but does not contain a reduction catalyst, and the second catalyst layer contains a reduction catalyst but does not contain an oxidation catalyst. As a result, this allows HC and CO in exhaust gas to be purified particularly well.

In a preferred mode of the present invention, the first catalyst layer contains the oxidation catalyst but does not contain the reduction catalyst, and the second catalyst layer contains the reduction catalyst but does not contain the oxidation catalyst. As a result, this allows HC and CO in exhaust gas to be purified particularly well.

In a preferred mode of the present invention, taking the total length of the partition wall in the extension direction thereof as 100%, the first catalyst layer is disposed, on the surface of the partition wall on the side in contact with the inlet side cells, over a length of 40% to 75% of the total length of the partition wall. Purification reactions can be actively elicited as a result upstream of the exhaust gas purification catalyst. In consequence, reaction heat at the time of the purification reaction on the upstream side can be transmitted downstream, and the entire catalyst can be warmed efficiently.

In a preferred mode of the present invention, taking a total length of the partition wall in the extension direction thereof as 100%, the second catalyst layer is disposed, on the surface of the partition wall on the side in contact with the outlet side cells, over a length of 35% to 70% of the total length of the partition wall. Pressure loss can be better reduced when length lies within such a range. Therefore, a reduction in pressure loss and enhancement of exhaust gas purification performance can both be achieved at a higher level.

In a preferred mode of the present invention, the whole surface of the partition wall on the side in contact with the inlet side cells and the whole surface of the partition wall on the side in contact with the outlet side cells are covered by at least either one of the first catalyst layer and the second catalyst layer. As a result, exhaust gas flows in more uniformly, in the extension direction of the partition wall. Therefore, a reduction in pressure loss and enhancement of catalyst performance can both be achieved at a higher level.

In a preferred mode of the present invention, the first catalyst layer is disposed so that the length thereof in the extension direction of the partition wall decreases gradually from the surface of the partition wall on the side in contact with the inlet side cells towards the surface of the partition wall on the side in contact with the outlet side cells; and the second catalyst layer is disposed so that the length thereof in the extension direction of the partition wall increases gradually from the surface of the partition wall on the side in contact with the inlet side cells towards the surface of the partition wall on the side in contact with the outlet side cells. With this configuration, the catalyst layers described above can be suitably arranged.

In a preferred mode of the present invention, the internal combustion engine is a gasoline engine. The above-described effects can be brought out more suitably in a case where the internal combustion engine is a gasoline engine.

DESCRIPTION OF EMBODIMENTS

Figure 1:
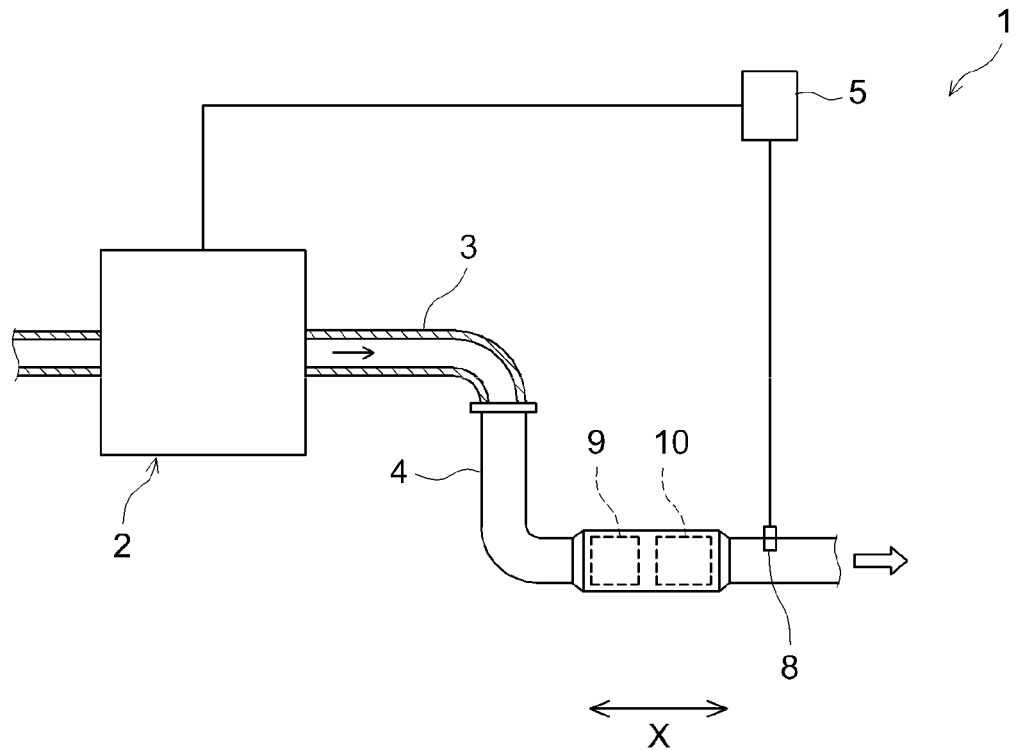
FIG. 1 is a schematic diagram illustrating an exhaust gas purification device according to an embodiment, and peripheral structures thereof.

Preferred embodiments of the present invention will be explained below with reference to accompanying drawings. Any features other than the features specifically set forth in the present description and which may be necessary for carrying out the present invention can be regarded as instances of design matter, for a person skilled in the art, based on conventional techniques in the technical field in question. The present invention can be conducted on the basis of the disclosure herein and common technical knowledge in the relevant technical field. In the drawings below, members and portions that elicit identical effects are denoted with identical reference symbols, and a recurrent explanation thereof will be omitted or simplified. The dimensional relationships (length, width, thickness and so forth) in the figures do not necessarily reflect actual dimensional relationships. A numerical value range notated as "A to B" (where A and B are each any one of numerical values) herein denotes a range of values equal to or larger than A and equal to or smaller than B.

FIG. 1 is a schematic diagram illustrating an exhaust gas purification device 1, and peripheral structures thereof. The exhaust gas purification device 1 is provided in an exhaust system of an internal combustion engine (engine) 2. An air-fuel mixture containing oxygen and fuel gas is supplied to the internal combustion engine 2. The air-fuel mixture is burned in the internal combustion engine 2, and the resulting combustion energy is converted to mechanical energy. The burned air-fuel mixture becomes exhaust gas that is discharged to the exhaust system. The internal combustion engine 2 of the present embodiment is configured mainly in the form of a gasoline engine of an automobile. However, the internal combustion engine 2 may be an engine (for instance a diesel engine) other than a gasoline engine.

The exhaust gas purification device 1 purifies harmful components, for instance, hydrocarbons (HC), carbon monoxide (CO) and nitrogen oxides ($NO_x$), contained in the exhaust gas, and traps particulate matter (PM) contained in the exhaust gas that is emitted from the internal combustion engine 2. The exhaust gas purification device 1 is provided with an exhaust passage (exhaust manifold 3 and exhaust pipe 4) that communicates the internal combustion engine 2 with the exhaust system, an engine control unit (ECU) 5, an upstream catalyst 9, and a gasoline particulate filter (GPF) 10. The arrow in the figure denotes the flow direction of the exhaust gas.

The exhaust passage in the present embodiment is made up of the exhaust manifold 3 and the exhaust pipe 4. One end of the exhaust manifold 3 is connected to an exhaust port (not shown) that communicates with the exhaust system of the internal combustion engine 2. The other end of the exhaust manifold 3 is connected to the exhaust pipe 4.

The upstream catalyst 9 and the GPF 10 are disposed halfway the exhaust pipe 4. The GPF 10 is an example of an exhaust gas purification catalyst. The configuration of the upstream catalyst 9 may be similar to conventional configurations, and is not particularly limited. The upstream catalyst 9 may be for instance a conventionally known oxidation catalyst (diesel oxidation catalyst (DOC)), a three-way catalyst, or a $NO_x$ adsorption reduction catalyst (lean $NO_x$ trap (LNT)). The upstream catalyst 9 may have for instance a carrier, and a noble metal such as rhodium (Rh), palladium (Pd) or platinum (Pt), supported on the carrier. The upstream catalyst 9 may have for instance a function of raising the temperature of exhaust gas flowing into the GPF 10, during regeneration of the GPF 10. The upstream catalyst 9 need not be necessarily provided, and can be omitted. A downstream catalyst can be further disposed downstream of the GPF 10.

The ECU 5 is electrically connected to the exhaust gas purification device 1 and the internal combustion engine 2. The ECU 5 controls the exhaust gas purification device 1 and the internal combustion engine 2. The configuration of the ECU 5 may be identical to conventional configurations, and is not particularly limited. The ECU 5 may be for instance a digital computer. An input port (not shown) is provided in the ECU 5. The ECU 5 is electrically connected to sensors (for instance a pressure sensor 8) that are installed at various sites in the exhaust gas purification device 1 and the internal combustion engine 2. Information detected by the sensors is transmitted thereby to the ECU 5, in the form of electrical signals, via the input port. An output port (not shown) is also provided in the ECU 5. The ECU 5 transmits control signals via the output port. For instance, the ECU 5 controls startup and stop of the exhaust gas purification device 1 for example depending on the amount of exhaust gas discharged by the internal combustion engine 2.

Figure 2:
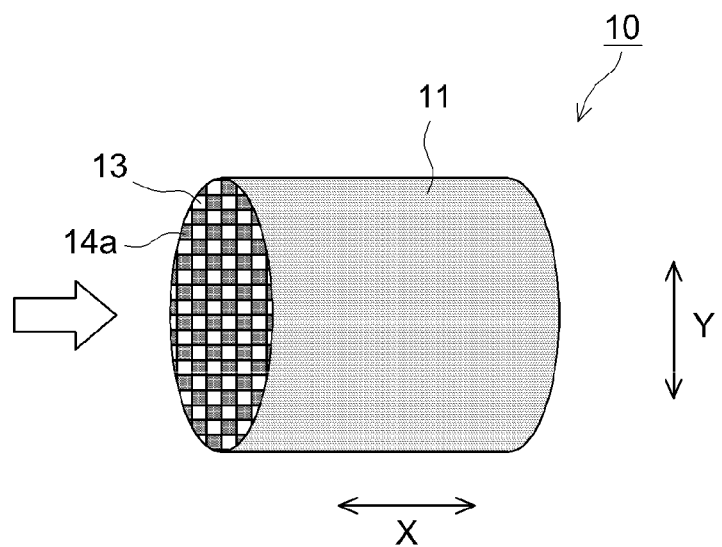
FIG. 2 is a perspective-view diagram illustrating schematically an exhaust gas purification catalyst according to an embodiment.
Figure 3:
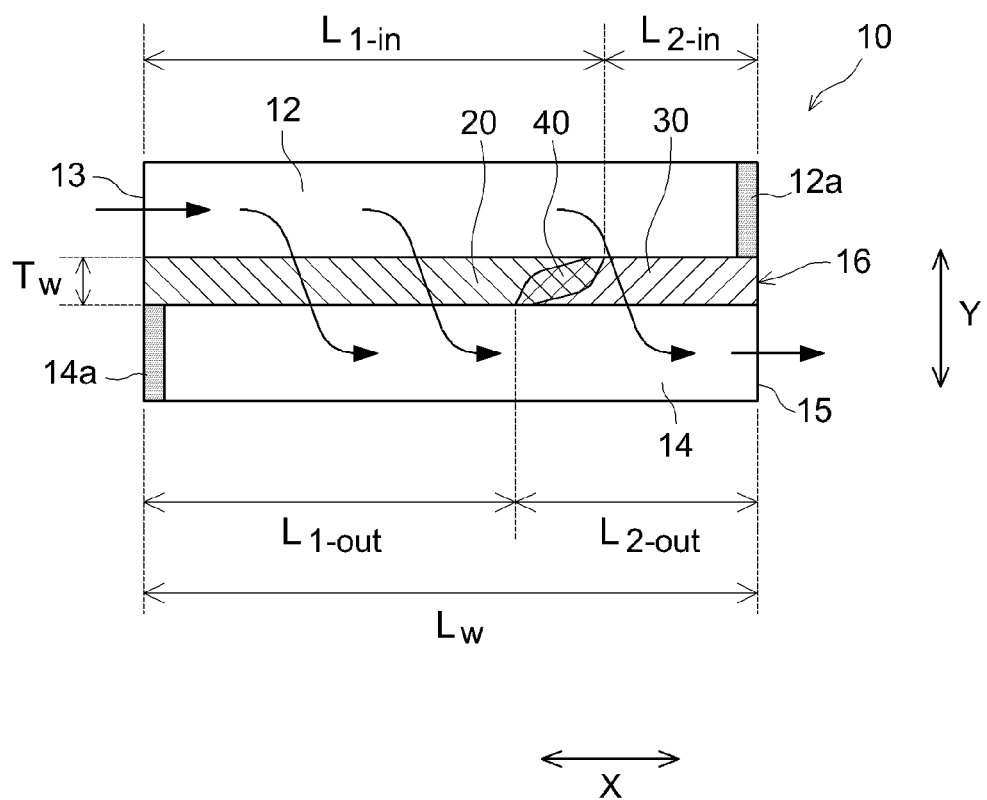
FIG. 3 is a partial cross-sectional diagram illustrating schematically an exhaust gas purification catalyst according to an embodiment.

FIG. 2 is a perspective-view diagram of the GPF 10. FIG. 3 is a partial cross-sectional diagram of an enlargement of part of a cross section resulting from cutting the GPF 10 in a cylinder axis direction. The flow direction of exhaust gas in FIGS. 2 and 3 is depicted with arrows. Specifically, the left side in FIGS. 2 and 3 is the upstream side (front side) of the exhaust pipe 4, and the right side is the downstream side (rear side) of the exhaust pipe 4. The reference symbol X denotes the cylinder axis direction of the GPF 10, in other words, the extension direction of the partition wall 16. The reference symbol Y denotes a direction, perpendicular to that of the reference symbol X, from the surface of the partition wall 16 in contact with the inlet side cells 12 towards the surface on the side in contact with the outlet side cells 14 i.e. the reference symbol Y denotes a thickness direction of the partition wall 16. These reference symbols are merely directions for convenience of explanation, and are not meant to limit in any way the manner in which the GPF 10 is installed.

The GPF 10 has the function of purifying harmful components contained in the exhaust gas, and trapping particulate matter (PM) contained in the exhaust gas. The GPF 10 is provided with a base 11 of wall flow structure, a first catalyst layer 20, and a second catalyst layer 30.

The base 11 makes up a framework of the GPF 10. The base 11 is a honeycomb structure. As the base 11, conventional bases of various materials and forms that are used in this kind of applications can be used. For instance, a base made up of a highly heat-resistant material typified by ceramics such as cordierite, aluminum titanate, silicon carbide (SiC) and the like, and alloys such as stainless steel, can be used herein. In the present embodiment the overall outer shape of the base 11 is cylindrical. However, the overall outer shape of the base 11 is not particularly limited, and for instance an elliptic cylinder shape or polygonal cylinder shape may also be adopted.

The base 11 has inlet side cells 12 in which an end 13 on the exhaust gas inflow side is open, outlet side cells 14 in which an end 15 on the exhaust gas outflow side is open, and a partition wall 16 that partitions the inlet side cells 12 and the outlet side cells 14. The shape of the inlet side cells 12 and of the outlet side cells 14 is not particularly limited. For instance, the inlet side cells 12 and the outlet side cells 14 may adopt various geometrical shapes, such as a rectangular shape encompassing squares, parallelograms, rectangles and trapezoids, and also triangular and other polygonal shapes (for instance, hexagons and octagons), as well as circular shapes. A sealing section 12a is disposed at the end on the exhaust gas outflow side of the inlet side cells 12, the end on the exhaust gas outflow side being plugged by the sealing section 12a. A sealing section 14a is disposed at the end on the exhaust gas inflow side of the outlet side cells 14, the end on the exhaust gas inflow side being plugged by the sealing section 14a.

The inlet side cells 12 and the outlet side cells 14 are partitioned by the partition wall 16. The partition wall 16 has a porous structure that allows exhaust gas to pass therethrough. The porosity of the partition wall 16 is not particularly limited, but may be about 20 to 70 vol %, for example 50 to 65 vol %, for instance from the viewpoint of reducing pressure loss. The average pore size of the partition wall 16 is not particularly limited, but may be about 5 to 30 μm and for example 10 to 20 μm, for instance from the viewpoint of reducing pressure loss. The partition wall 16 extends in the cylinder axis direction of the GPF 10, i.e. in the X direction. A total length $L_w$ of the partition wall 16 in the X direction is not particularly limited, but may be about 10 to 500 mm, for instance about 50 to 300 mm. The length of the partition wall 16 in the Y direction, i.e. a thickness $T_w$ of the partition wall 16, is not particularly limited, but may be for instance about 1 to 30 mils (where 1 mil is about 25.4 μm), for example from the viewpoint of reducing pressure loss.

The first catalyst layer 20 and the second catalyst layer 30 both are disposed in the interior of the partition wall 16. By arranging the first catalyst layer 20 and the second catalyst layer 30 in the interior of the partition wall 16, it becomes possible to keep pressure loss relatively low, as compared with a case for instance where the catalyst layer is provided on the surface of the partition wall 16. The feature "catalyst layer is disposed in the interior of the partition wall" herein signifies that the catalyst layer is mainly present in the interior of the partition wall 16. More specifically, in an observation for instance of a cross section of the first catalyst layer 20 or the second catalyst layer 30 using an electron microscope, the proportion of metal catalyst present in the interior of the partition wall 16 is typically 80 mass % or higher, for instance 90 mass % or higher, and preferably 95 mass % or higher when the entire amount of the metal catalyst in an area having a length of $0.1L_w$ along the X direction, from the end 13 on the exhaust gas inflow side or the end 15 on the exhaust gas outflow side is taken as 100 mass %. This is therefore clearly distinct from an instance where, when attempting to arrange the catalyst layers on the exterior (typically on the surface) of the partition wall 16, for example part of the catalyst layer erodes unintentionally the interior of the partition wall 16.

The first catalyst layer 20 and the second catalyst layer 30 contain a metal catalyst. The metal catalyst is for instance a reaction catalyst for purifying (abating) harmful components in the exhaust gas, and burning off/removing PM trapped in the pores of the partition wall 16. As the metal catalyst, various metal species capable of functioning as an oxidation catalyst or a reduction catalyst, and that are conventionally known in the relevant technical field can be appropriately used. Preferred examples of the metal catalyst include Rh, Pd, Pt, ruthenium (Ru), osmium (Os) and iridium (Ir), of the platinum group, as well as alloys of the foregoing. In addition to the platinum group, or instead of the platinum group, the metal catalyst may include for instance iron (Fe), cobalt (Co), nickel (Ni), copper (Cu), silver (Ag) and gold (Au).

In the present embodiment, the first catalyst layer 20 and the second catalyst layer 30 contain mutually different metal species. Specifically, one from among the first catalyst layer 20 and the second catalyst layer 30 contains an oxidation catalyst, but does not contain a reduction catalyst, while the other one contains a reduction catalyst, but does not contain an oxidation catalyst. By separately arranging the oxidation catalyst and the reduction catalyst in respective separate catalyst layers, it becomes possible to suppress grain growth (sintering) and alloying of the metal catalyst, and to ensure a wide contact area with exhaust gas. As a result, a desired catalytic activity can be brought out stably over long periods of time. The durability of the GPF 10 can be enhanced thereby. Preferred examples of the oxidation catalyst include Pd, Pt and Pd—Pt alloys. The reduction catalyst may be a metal catalyst having a higher reducing power than that of the oxidation catalyst. Preferred examples of the reduction catalyst include Rh.

In a preferred embodiment, the first catalyst layer 20 contains a reduction catalyst, for instance Rh. The second catalyst layer 30 contains an oxidation catalyst, for instance at least either one of Pd and Pt. In this embodiment, the first catalyst layer 20 does not contain an oxidation catalyst, and the second catalyst layer 30 does not contain a reduction catalyst. Such a configuration allows $NO_x$ in exhaust gas to be purified particularly well.

In another preferred embodiment, the first catalyst layer 20 contains an oxidation catalyst, for instance at least either one of Pd and Pt. The second catalyst layer 30 contains a reduction catalyst, for instance Rh. In this embodiment, the first catalyst layer 20 does not contain a reduction catalyst, and the second catalyst layer 30 does not contain an oxidation catalyst. Such a configuration allows HC and CO in exhaust gas to be purified particularly well.

The oxidation catalyst and the reduction catalyst are typically supported on a carrier. Carriers of various materials conventionally utilized in this kind of applications can be used herein as the carrier. For instance, a metal oxide such as alumina ($Al_2O_3$), ceria ($CeO_2$), zirconia ($ZrO_2$), silica ($SiO_2$) or titania ($TiO_2$), and solid solutions of the foregoing, for instance, a zirconia-ceria complex oxide (ZC complex oxide: $ZrO_2$—$CeO_2$) can be suitably used. Preferred among the foregoing are alumina and a ZC complex oxide.

The first catalyst layer 20 and the second catalyst layer 30 may each contain as appropriate optional components, besides the metal catalyst and the carrier on which the metal catalyst is supported. Examples of such optional components include a co-catalyst on which a metal catalyst is not supported, an oxygen storage material (OSC (oxygen storage capacity) material) having oxygen storage capacity, a $NO_x$ adsorbent having $NO_x$ storage capacity, and a stabilizer. Examples of the co-catalyst include alumina and silica. Examples of the OSC material include ceria and complex oxides containing ceria, for instance a ZC complex oxide.

Examples of stabilizers include rare earth elements such as lanthanum (La) and yttrium (Y), alkaline earth elements such as calcium (Ca) and barium (Ba), and transition metal elements. These elements are typically present in the form of oxides, in the catalyst layers. The catalyst layer containing the oxidation catalyst, from among the first catalyst layer 20 and the second catalyst layer 30, contains preferably a stabilizer, for instance barium. As a result, poisoning of the oxidation catalyst can be suitably suppressed, and catalytic activity can be enhanced. Dispersibility of the oxidation catalyst can be thus increased, and grain growth in the oxidation catalyst can be suppressed to a yet higher degree.

The coating amounts of the first catalyst layer 20 and the second catalyst layer 30 are not particularly limited. Each coating amount may be set to about 100 g/L or less, preferably 80 g/L or less, and for instance 70 g/L or less, per liter of volume of the base (total bulk volume including cell volume), from the viewpoint of improving circulation of exhaust gas in the partition wall 16, and better reducing pressure loss. Meanwhile, the coating amount per liter of volume of the base may be set to about 5 g/L or more, preferably 10 g/L or more and for instance 20 g/L or more, from the viewpoint of better enhancing exhaust gas purification performance. Reduction of pressure loss and enhancement of exhaust gas purification performance can both be achieved at a high level when the above ranges are satisfied. The ratio of coating amounts of first catalyst layer 20 and second catalyst layer 30 is not particularly limited, and for instance may be set to first catalyst layer:second catalyst layer=30 to 70:70 to 30, from the viewpoint of better reducing pressure loss.

The first catalyst layer 20 is disposed along the extension direction (X direction) of the partition wall 16, from the end 13 on the exhaust gas inflow side. The first catalyst layer 20 in FIG. 3 has substantially an inverted trapezoid cross-sectional shape. In other words, the first catalyst layer 20 is disposed so that the length of the first catalyst layer 20 in the X direction decreases gradually from the surface of the partition wall 16 on the side in contact with the inlet side cells 12 towards the surface of the partition wall 16 on the side in contact with the outlet side cells 14. The second catalyst layer 30 is disposed along the extension direction (X direction) of the partition wall 16, from the end 15 on the exhaust gas outflow side. The second catalyst layer 30 in FIG. 3 has substantially a trapezoid cross-sectional shape. In other words, the second catalyst layer 30 is disposed so that the length of the second catalyst layer 30 in the X direction increases gradually from the surface of the partition wall 16 on the side in contact with the inlet side cells 12 towards the surface of the partition wall 16 on the side in contact with the outlet side cells 14.

The first catalyst layer 20 and the second catalyst layer 30 are each disposed so as to be in contact with the inlet side cells 12 and the outlet side cells 14. The maximum thickness of the first catalyst layer 20 (maximum length in the Y direction) is identical to the thickness $T_w$ of the partition wall 16. The maximum thickness of the second catalyst layer 30 (maximum length in the Y direction) is identical to the thickness $T_w$ of the partition wall 16. As a result, it becomes possible to suitably reduce pressure loss, by arranging the catalyst layers in a distributed manner in the Y direction. Exhaust gas purification performance can be enhanced by improving contact between the exhaust gas and the metal catalyst. The feature "identical to the thickness $T_w$ of the partition wall 16" herein is not to be interpreted in strict terms, and allows for errors (fluctuations of about $0.95T_w$ to $1.05T_w$, preferably $0.98T_w$ to $1.02T_w$, for instance $0.99T_w$ to $1.01T_w$) arising for instance from manufacturing precision.

In the GPF 10, the area ratio of the first catalyst layer 20 and the second catalyst layer 30 differs between the surface of the partition wall 16 on the side in contact with the inlet side cells 12 and the surface of the partition wall 16 on the side in contact with the outlet side cells 14. Specifically, $A_{1\text{-}in}$ is defined herein as the surface area of the first catalyst layer 20 and $A_{2\text{-}in}$ as the surface area of the second catalyst layer 30, on the surface of the partition wall 16 on the side in contact with the inlet side cells 12. Further, $A_{1\text{-}out}$ is defined herein as the surface area of the first catalyst layer 20 and $A_{2\text{-}out}$ as the surface area of the second catalyst layer 30, on the surface of the partition wall 16 on the side in contact with the outlet side cells 14. The values of the area ratio ($A_{1\text{-}in}/A_{2\text{-}in}$) and the of the area ratio ($A_{1\text{-}out}/A_{2\text{-}out}$) are herein different from each other. In the present embodiment, ($A_{1\text{-}in}/A_{2\text{-}in}$)>($A_{1\text{-}out}/A_{2\text{-}out}$).

In the GPF 10, a ratio of the length of the first catalyst layer 20 in the extension direction and the length of the second catalyst layer 30 in the extension direction differ between the surface of the partition wall 16 on the side in contact with the inlet side cells 12 and the surface of the partition wall 16 on the side in contact with the outlet side cells 14. Specifically, $L_{1\text{-}in}$ is defined herein as the length of the first catalyst layer 20 in the extension direction, and $L_{2\text{-}in}$ as the length of the second catalyst layer 30 in the extension direction, on the surface of the partition wall 16 on the side in contact with the inlet side cells 12. Further, $L_{1\text{-}out}$ is defined as the length of the first catalyst layer 20 in the extension direction, and $L_{2\text{-}out}$ as the length of the second catalyst layer 30 in the extension direction, on the surface of the partition wall 16 on the side in contact with the outlet side cells 14. Herein values of length ratio ($L_{1\text{-}in}/L_{2\text{-}in}$) and a of length ratio ($L_{1\text{-}out}/L_{2\text{-}out}$) are different from each other. As a result, it becomes possible to suitably reduce pressure loss, by arranging the catalyst layers in a distributed manner in the X direction. Exhaust gas purification performance can be enhanced by improving contact between the exhaust gas and the metal catalyst. In the present embodiment, ($L_{1\text{-}in}/L_{2\text{-}in}$)>($L_{1\text{-}out}/L_{2\text{-}out}$).

Taking the total length $L_w$ of the partition wall 16 in the extension direction as 100%, in a preferred embodiment a length $L_{1\text{-}in}$ of the surface of the first catalyst layer 20 in the extension direction, on the side in contact with the inlet side cells 12, and a length $L_{1\text{-}out}$ of the surface of the first catalyst layer 20, on the side in contact with outlet side cells 14, satisfy the following expression: $5\% \leq |L_{1\text{-}in} - L_{1\text{-}out}|$; for instance the following expression: $10\% \leq |L_{1\text{-}in} - L_{1\text{-}out}| \leq 20\%$. Taking the total length $L_w$ of the partition wall 16 in the extension direction as 100%, in another preferred embodiment, a length $L_{2\text{-}in}$ of the surface of the second catalyst layer 30 in the extension direction, on the side in contact with the inlet side cells 12, and a length $L_{2\text{-}out}$ of the surface of the second catalyst layer 30 in the extension direction, on the side in contact with outlet side cells 14, satisfy the following expression: $5\% \leq |L_{2\text{-}in} - L_{2\text{-}out}|$; for instance the following expression: $10\% \leq |L_{2\text{-}in} - L_{2\text{-}out}| \leq 20\%$. The effect of the art disclosed herein can be yet better brought out as a result.

The length $L_{1\text{-}in}$ of the first catalyst layer 20 in the extension direction, on the surface of the partition wall 16 on the side in contact with the inlet side cells 12, is not particularly limited, but in a preferred embodiment, $L_{1\text{-}in}$ is about 35% or more, typically 40% or more, for instance 50% or more, with respect to 100% as the total length $L_w$ of the partition wall 16 in the extension direction, and is smaller than $L_w$, being typically about 80% or less, typically 75% or less, and for instance 70% or less. The length $L_{2\text{-}in}$ of the second catalyst layer 30 in the extension direction is not particularly limited, but in a preferred embodiment, $L_{2\text{-}in}$ is about 20% or more, typically 25% or more, for instance 30% or more, with respect to 100% as the total length $L_w$ of the partition wall 16 in the extension direction, and is smaller than $L_w$, being typically about 65% or less, typically 60% or less, and for instance 50% or less.

In a preferred embodiment, the first catalyst layer 20 is disposed so that $L_{1\text{-}in}$ is a length of 40% to 75%, for instance 50% or more, of the total length $L_w$ of the partition wall 16, on the surface of the partition wall 16 on the side in contact with the inlet side cells 12. As a result, a purification reaction actively occurs in a region upstream of the GPF 10, i.e. in the vicinity of the end 13 on the exhaust gas inflow side. In consequence, reaction heat at the time of the purification reaction can be transmitted to a region downstream of the GPF 10, i.e. a region in the vicinity of the end 15 on the exhaust gas outflow side, and the entire catalyst can be warmed efficiently. In green vehicles equipped with such energy-saving mechanisms, and in which the engine repeatedly starts and stops during operation or during temporary stops, for instance when waiting at traffic lights, the temperature of exhaust gas tends to become unstable accompanying engine startup and stops; herein, however, exhaust gas purification performance can be delivered yet more stably by virtue of the above configuration.

In another preferred embodiment, the total length $L_w$ of the partition wall 16, the length $L_{1\text{-}in}$ of the first catalyst layer 20 and the length $L_{2\text{-}in}$ of the second catalyst layer 30, on the surface of the partition wall 16 on the side in contact with the inlet side cells 12, satisfy the following expression: $0.8L_w \leq (L_{1\text{-}in} + L_{2\text{-}in}) \leq 1.2L_w$; for instance the following expression: $0.9L_w \leq (L_{1\text{-}in} + L_{2\text{-}in}) \leq 1.1L_w$. Among these, preferably, the whole surface of the partition wall 16 on the side in contact with the inlet side cells 12 is covered by a at least either one of the first catalyst layer 20 and the second catalyst layer 30. In particular, the whole surface of the partition wall 16 on the side in contact with the inlet side cells 12 is covered by either one from among the first catalyst layer 20 and the second catalyst layer 30, as in the present embodiment. More preferably, the total length $L_w$ of the partition wall 16, the length $L_{1\text{-}in}$ of the first catalyst layer 20 and the length $L_{2\text{-}in}$ of the second catalyst layer 30, on the surface of the partition wall 16 on the side in contact with the inlet side cells 12, satisfy the following expression: $L_w \leq (L_{1\text{-}in} + L_{2\text{-}in}) \leq 1.2L_w$, and particularly preferably satisfy the following expression: $L_w = (L_{1\text{-}in} + L_{2\text{-}in})$. As a result, the flow rate of exhaust gas in the X direction can be made uniform yet better. Therefore, a reduction in pressure loss and enhancement of exhaust gas purification performance can both be achieved, at a higher level, when the above ranges are satisfied.

In the present embodiment the length $L_{1\text{-}in}$ of the first catalyst layer 20 in the extension direction is greater than the length $L_{2\text{-}in}$ of the second catalyst layer 30 in the extension direction, on the surface of the partition wall 16 on the side in contact with the inlet side cells 12. That is, $L_{1\text{-}in}$ and $L_{2\text{-}in}$ obey $L_{1\text{-}in} > L_{2\text{-}in}$. Herein, $L_{1\text{-}in}$ and $L_{2\text{-}in}$ may obey $L_{1\text{-}in} = L_{2\text{-}in}$, or $L_{1\text{-}in} < L_{2\text{-}in}$.

The length $L_{1\text{-}out}$ of the first catalyst layer 20 in the extension direction, on the surface of the partition wall 16 on the side in contact with the outlet side cells 14, is not particularly limited, but in a preferred embodiment $L_{1\text{-}out}$ is about 25% or more, typically 30% or more, for instance 40% or more, with respect to 100% as the total length $L_w$ of the partition wall 16 in the extension direction, and is smaller than $L_w$, being typically about 70% or less, typically 65% or less, and for instance 60% or less. The length $L_{2\text{-}out}$ of the second catalyst layer 30 in the extension direction is not particularly limited, but in a preferred embodiment $L_{2\text{-}out}$ is about 30% or more, typically 35% or more, for instance 40% or more, with respect to 100% as the total length $L_w$ of the partition wall 16 in the extension direction, and is smaller than $L_w$, being typically about 75% or less, typically 70% or less, and for instance 60% or less.

In a preferred embodiment, the second catalyst layer 30 is disposed so that $L_{2\text{-}out}$ is a length of 35% to 70%, for instance 40% or more, of the total length $L_w$ of the partition wall 16, on the surface of the partition wall 16 on the side in contact with the outlet side cells 14. As a result, it becomes possible to better reduce pressure loss at the time of inflow of exhaust gas into the inlet side cells 12 of the GPF 10. Therefore, a reduction in pressure loss and enhancement of exhaust gas purification performance can both be achieved at a higher level.

In another preferred embodiment, the total length $L_w$ of the partition wall 16, the length $L_{1\text{-}out}$ of the first catalyst layer 20 and the length $L_{2\text{-}out}$ of the second catalyst layer 30, on the surface of the partition wall 16 on the side in contact with the outlet side cells 14, satisfy the following expression: $0.8L_w \leq (L_{1\text{-}out}+L_{2\text{-}out}) \leq 1.2L_w$; for instance the following expression: $0.9L_w \leq (L_{1\text{-}out}+L_{2\text{-}out}) \leq 1.1L_w$. Among these, preferably, the whole surface of the partition wall 16 on the side in contact with the outlet side cells 14 is covered by at least either one of the first catalyst layer 20 and the second catalyst layer 30. In particular, the whole the surface of the partition wall 16 on the side in contact with the outlet side cells 14 is covered by either one from among the first catalyst layer 20 and the second catalyst layer 30, as in the present embodiment. More preferably, the total length $L_w$ of the partition wall 16, the length $L_{1\text{-}out}$ of the first catalyst layer 20 and the length $L_{2\text{-}out}$ of the second catalyst layer 30, on the surface of the partition wall 16 on the side in contact with the outlet side cells 14, satisfy the following expression: $L_w \leq (L_{1\text{-}out}+L_{2\text{-}out}) \leq 1.2L_w$, and particularly preferably the following expression: $L_w = (L_{1\text{-}out}+L_{2\text{-}out})$. As a result, the flow rate of exhaust gas in the X direction can be made uniform yet better. Therefore, a reduction in pressure loss and enhancement of exhaust gas purification performance can both be achieved, at a higher level, when the above ranges are satisfied.

In the present embodiment, the length $L_{1\text{-}out}$ of the length of the first catalyst layer 20 in the extension direction is longer than the length $L_{2\text{-}out}$ of the second catalyst layer 30 in the extension direction, on the surface of the partition wall 16 on the side in contact with the outlet side cells 14. That is, $L_{1\text{-}out}$ and $L_{2\text{-}out}$ obey $L_{1\text{-}out}>L_{2\text{-}out}$. However, $L_{1\text{-}out}$ and $L_{2\text{-}out}$ may obey $L_{1\text{-}out}=L_{2\text{-}out}$, or $L_{1\text{-}out}<L_{2\text{-}out}$.

In the present embodiment either one of the first catalyst layer 20 and the second catalyst layer 30 is disposed throughout of the partition wall 16, i.e. throughout the partition wall 16 in the extension direction and the thickness direction. Such a configuration allows better reducing pressure loss, and removing harmful component from within the exhaust gas with high probability. As a result, it becomes possible to better suppress emission of insufficiently purified exhaust gas, caused by slippage of exhaust gas at the portion at which the catalyst layers are not disposed.

In the present embodiment, the GPF 10 is further provided with a third catalyst layer 40 in which the first catalyst layer 20 and the second catalyst layer 30 overlap each other. In forming the catalyst layers throughout the partition wall 16, the third catalyst layer 40 is a region at which the first catalyst layer 20 and the second catalyst layer 30 overlap each other in the vicinity of the interface of the first catalyst layer 20 and the second catalyst layer 30. The third catalyst layer 40 contains both an oxidation catalyst and a reduction catalyst, and accordingly can be regarded as a catalyst layer that is different from the first catalyst layer 20 and the second catalyst layer 30. From the viewpoint of achieving both reduction of pressure loss and enhancement of exhaust gas purification performance at a high level, the third catalyst layer 40 may be about 10% or more, for instance 20% or more, and 30% or more in an example, with respect to 100% as the volume of the whole partition wall 16, and may be about 80% or less, for instance 70% or less, and 60% or less in an example.

The GPF 10 having a configuration as described above can be produced for instance in accordance with a method such as the one below. Firstly, d a base 11 such as that illustrated in FIG. 2 is prepare. Two types of slurries for catalyst layer formation, namely a first slurry and a second slurry, are prepared next. The slurries for catalyst layer formation contain, as an essential component, respective metal catalysts (typically, a solution containing a metal catalyst in the form of ions) that are mutually different between the slurries; the slurries can also contain other optional components, for instance a carrier, a co-catalyst, an OSC material, and various additives. The properties of the slurries (viscosity, solids content and so forth) may be adjusted as appropriate for instance depending on the size of the base 11 that is used, the porosity of the partition wall 16 and the desired properties of the catalyst layer 20.

From the viewpoint of suitably forming the first catalyst layer 20 and the second catalyst layer 30 having the above-described cross-sectional shape, the first slurry and the second slurry may be adjusted to exhibit low viscosity so that a viscosity $\eta_{400}$ at a temperature of 25° C. and for a shear velocity of 400 $s^{-1}$ is 50 mPa·s or less (for instance 1 to 50 mPa·s), preferably 30 mPa·s or less, more preferably 20 mPa·s or less, and in particular 15 mPa·s or less (for instance 1 to 15 mPa·s). The viscosities of the first slurry and the second slurry may be set to be substantially identical (typically, so that a difference therebetween is 10 mPa·s or less, for instance so that a difference therebetween is 5 mPa·s or less). Slurry viscosity is herein a value measured using a commercially available shear viscometer in a temperature environment at 25° C.

Next, the prepared first slurry is caused to flow into the inlet side cells 12 from the end 13 on the exhaust gas inflow side of the base 11, to be supplied over a predetermined length $L_{1\text{-}in}$ of the partition wall 16 along the X direction. Suction applied from the side of the outlet side cells 14 gives rise to a pressure difference between the inlet side cells 12 and outlet side cells 14. The suction speed of the slurry may be set to about 10 to 100 m/s, preferably 10 to 80 m/s, and for instance 50 m/s or less, from the viewpoint of suitably forming the first catalyst layer 20 having the above-described cross-sectional shape. The first slurry is thereby caused to spread within the pores of the partition wall 16. The base 11 having the first slurry applied thereonto is then dried and fired at a predetermined temperature and for a predetermined time. The drying and firing methods may be similar to those resorted to in the formation of conventional catalyst layers. A first catalyst layer 20 having a substantially inverted trapezoid cross-sectional shape becomes formed as a result in the interior of the partition wall 16.

Next, the prepared second slurry is caused to flow into the outlet side cells 14 from the end 15 on the exhaust gas outflow side of the base 11, to be supplied over a predetermined length $L_{2\text{-}out}$ of the partition wall 16 along the X direction. The length $L_{2\text{-}out}$ of supply of the second slurry may be determined by subtracting the length $L_{1\text{-}out}$ of the portion at which the first catalyst layer 20 is formed from the total length $L_w$ of the partition wall 16 in the X direction. Suction applied from the side of the inlet side cells 12 gives rise to a pressure difference between the outlet side cells 14 and the inlet side cells 12. The suction speed of the slurry may be set to about 10 to 100 m/s, preferably 10 to 80 m/s, and for instance 50 m/s or less, from the viewpoint of suitably forming the second catalyst layer 30 having the above-described cross-sectional shape. As a result, the second slurry is caused to spread within the pores of the partition wall 16. The base 11 having the second slurry applied thereonto is then dried and fired at a predetermined temperature and for a predetermined time. The drying and firing methods may be similar to those resorted to in the formation of conventional catalyst layers. As a result, a second catalyst layer 30 having a substantially trapezoid cross-sectional shape becomes formed in the interior of the partition wall 16.

In the GPF 10 having the above configuration, the exhaust gas emitted by the internal combustion engine 2 flows into the inlet side cells 12, from end 13 on the exhaust gas inflow side. The exhaust gas having flowed into the inlet side cells 12 passes through the partition wall 16 of porous structure, and reaches the outlet side cells 14. The first catalyst layer 20 and the second catalyst layer 30 are disposed in the interior of the partition wall 16. As a result, harmful components and PM are removed from the exhaust gas, as the exhaust gas passes through the first catalyst layer 20 and/or the second catalyst layer 30 inside the partition wall 16. The exhaust gas having reached the outlet side cells 14 through the partition wall 16 is discharged, out of the GPF 10 from the end 15 on the exhaust gas outflow side, in a state of having had harmful components and PM removed therefrom.

Test examples according to the present invention will be explained next, but the invention is not meant to be limited to the test examples below.

Test Example I-1

Exhaust gas purification catalysts containing an oxidation catalyst and a reduction catalyst in a same catalyst layer were produced, as Comparative examples 1 to 3. Specifically, a cordierite base of wall flow type, such as the one illustrated in FIG. 2 (total length 122 mm; outer diameter 113 mm; volume 1.3 L; number of cells 300/in$^2$; average pore size 20 μm; porosity 65%) was prepared first. Then 28 g of an alumina powder (γ-Al$_2$O$_3$), 57 g of a ZC complex oxide (Zr/Ce ratio=7/2) powder, 2.5 g of barium sulfate (BaSO$_4$), a solution of rhodium nitrate (0.2 g on Rh basis) and a solution of palladium nitrate (0.8 g on Pd basis) were mixed in ion-exchanged water, to thereby prepare slurry A.

In Comparative examples 1 and 2, next, the prepared slurry A was caused to flow into the inlet side cells of the cordierite base, from the end on the exhaust gas inflow side, and was caused to coat the interior of the partition wall along the extension direction of the partition wall, in accordance with a vacuum suction method, over a length identical to the total length $L_w$ of the base along the extension direction of the partition wall, with drying and firing, to thereby form a catalyst layer. The coating amount of the catalyst layer per unit volume of the base was set to 88.5 g/L. The maximum thickness of the catalyst layer was set to 50% of the thickness $T_w$ of the partition wall, in Comparative example 1, and was set to thickness $T_w$, identical to that of the partition wall, in Comparative example 2. That is, in Comparative example 1 the catalyst layer is in contact with the inlet side cells, but not in contact with the outlet side cells. In Comparative example 2, the catalyst layer is in contact with the inlet side cells and the outlet side cells. Exhaust gas purification catalysts of Comparative examples 1 and 2 having the same catalyst layer were thus produced.

In Comparative example 3 the prepared slurry A was caused to flow into the inlet side cells of the cordierite base, from the end on the exhaust gas inflow side, and was caused to coat the interior of the partition wall along the extension direction of the partition wall, in accordance with a vacuum suction method, over a portion corresponding to 55% of the total length $L_w$ of the base along the extension direction of the partition wall, with drying and firing, to thereby form an inlet catalyst layer. Similarly, the prepared slurry A was caused to flow into the outlet side cells from the end on the exhaust gas outflow side, and was caused to coat the interior of the partition wall along the extension direction of the partition wall, in accordance with a vacuum suction method, over a portion corresponding to 55% of the total length $L_w$ of the base along the extension direction of the partition wall, with drying and firing, to thereby form an outlet catalyst layer. The coating amounts of the inlet catalyst layer and of the coating amount per unit volume of the base were set to half (44.25 g/L) that in Comparative examples 1 and 2. The maximum thicknesses of the inlet catalyst layer and of the outlet catalyst layer both were set to a thickness $T_w$, identical to that of the partition wall. An exhaust gas purification catalyst of Comparative example 3 having an inlet catalyst layer and an outlet catalyst layer was produced thus.

An exhaust gas purification catalyst having a configuration such as that illustrated in FIG. 3 was produced next, as Example 1. Specifically, firstly 18 g of an alumina powder (γ-Al$_2$O$_3$), 42 g of a ZC complex oxide (Zr/Ce ratio=7/2) powder and a solution of rhodium nitrate (0.2 g on Rh basis) were mixed in ion-exchanged water, to thereby prepare a Rh slurry. Next, 10 g of an alumina powder (γ-Al$_2$O$_3$), 15 g of a ZC complex oxide (Zr/Ce ratio=7/2) powder, 2.5 g of barium sulfate (BaSO$_4$) and a solution of palladium nitrate (0.8 g on Pd basis) were mixed in ion-exchanged water, to thereby prepare a Pd slurry.

Next, the prepared Rh slurry was caused to flow into the inlet side cells of the cordierite base, from the end on the exhaust gas inflow side, and was caused to coat the interior of the partition wall along the extension direction of the partition wall, in accordance with a vacuum suction method, with drying and firing, to form as a result a first catalyst layer in the interior of the partition wall so as to be in contact with the inlet side cells and the outlet side cells. The coating amount of the first catalyst layer per unit volume of the base was set to 60.2 g/L. The first catalyst layer was formed at a portion corresponding to 70% (0.7$L_w$) of the total length $L_w$ of the base, on the surface of the partition wall on the side in contact with the inlet side cells. The maximum thickness of the first catalyst layer was set to thickness $T_w$, identical to that of the partition wall.

Next, the prepared Pd slurry was caused to flow into the outlet side cells of the cordierite base, from the end on the exhaust gas outflow side, and was caused to coat the interior of the partition wall along the extension direction of the partition wall, in accordance with a vacuum suction method, with drying and firing, to form as a result a second catalyst layer in the interior of the partition wall so as to be in contact with the inlet side cells and the outlet side cells. The coating amount of the second catalyst layer per unit volume of the base was set to 28.3 g/L. The second catalyst layer was formed at a portion corresponding to 40% (0.4$L_w$) of the total length $L_w$ of the base, on the surface of the partition wall on the side in contact with the outlet side cells. The maximum thickness of the second catalyst layer was set to thickness $T_w$, identical to that of the partition wall.

The exhaust gas purification catalyst of Example 1 having the first catalyst layer and the second catalyst layer was thus produced.

Specifically, firstly the exhaust gas purification catalyst of each example was installed in the exhaust passage of a gasoline direct-injection vehicle, and a catalyst inlet gas temperature was raised from 100° C. to 520° C., at a rate of temperature rise of 10° C./min, using a heat exchanger. A purification rate of a $NO_x$ component was measured con-

TABLE 1

| | First catalyst layer (inlet catalyst layer in Comparative example 3) | | | | | Second catalyst layer (outlet catalyst layer in Comparative example 3) | | | | | Increase rate of pressure loss (%)*3 | $NO_x$ purification rate (%)*3 |
|---|---|---|---|---|---|---|---|---|---|---|---|---|
| | Catalyst metal species | $L_{1\text{-}in}$ (%)*1 | $L_{1\text{-}out}$ (%)*1 | Coating amount (g) | Maximum thickness (%)*2 | Catalyst metal species | $L_{2\text{-}in}$ (%)*1 | $L_{2\text{-}out}$ (%)*1 | Coating amount (g) | Maximum thickness (%)*2 | | |
| Comparative example 1 | Rh, Pd | 100 | | 88.5 | 50 | — | | | | | 100 | 100 |
| Comparative example 2 | Rh, Pd | 100 | | 88.5 | 100 | — | | | | | 54.7 | 97.6 |
| Comparative example 3 | Rh, Pd | 55 | | 44.25 | 100 | Rh, Pd | 55 | | 44.25 | 100 | 53 | 95 |
| Example 1 | Rh | 70 | 60 | 60.2 | 100 | Pd | 30 | 40 | 28.3 | 100 | 50.2 | 109.8 |

*1 Relative value with respect to $L_w$ as 100%.
*2 Relative value with respect to $T_w$ as 100%.
*3 Relative value with respect to the result of Comparative example 1 as 100%.

(Evaluation of Pressure Loss)

An increase rate of pressure loss in each produced exhaust gas purification catalyst was evaluated. Specifically, firstly a honeycomb base (reference) preceding application of the catalyst layer was prepared, and pressure during circulation of a 6 m³/min volume of air through the base was measured. Pressure at the time of circulation of a volume of 6 m³/min of air was then measured in the same way as in the reference, but using each produced exhaust gas purification catalyst (honeycomb base with catalyst layer). A rate of increase of pressure loss (%) was calculated on the basis of the following expression: [(pressure of exhaust gas purification catalyst—pressure of reference)/pressure of reference]×100. A smaller numerical value of the increase rate of pressure loss indicates that the corresponding catalyst is more suitable in terms of curtailing increases in pressure loss. Results are given in the corresponding column of Table 1. Table 1 sets out relative values referred to the increase rate of pressure loss in Comparative example 1 (100%).

Figure 4:
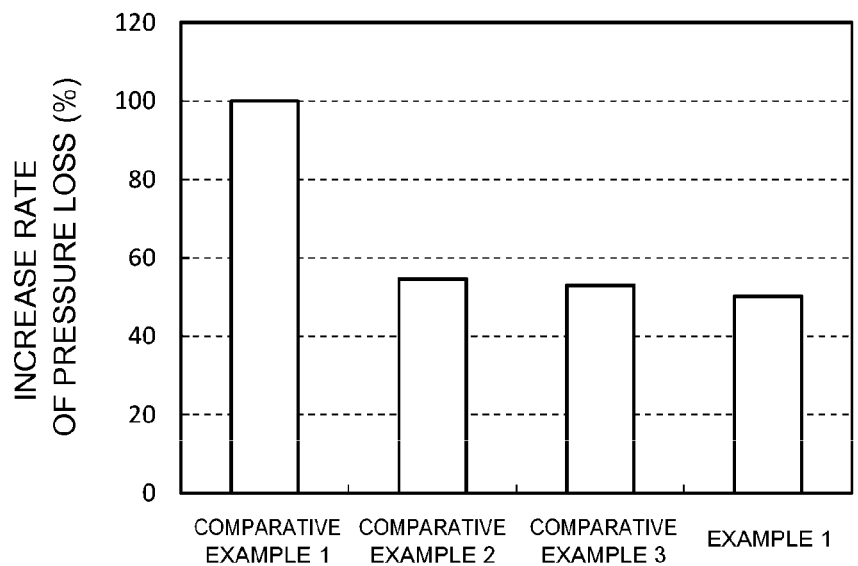
FIG. 4 is a graph of a comparison between the increase rates of pressure loss in Comparative examples 1 to 3 and Example 1.

FIG. 4 is a graph of a comparison between the increase rates of pressure loss in Comparative examples 1 to 3 and Example 1. As Table 1 and FIG. 4 reveal, the increase rate of pressure loss was reduced in Example 1 and Comparative examples 2 and 3 down to about half that of Comparative example 1. Among the foregoing, Example 1 exhibited the smallest value of increase rate of pressure loss. A conceivable underlying reason is that in Comparative example 1, where a catalyst layer is formed that is not in contact with the outlet side cells, the flow channels of exhaust gas are narrower at the portion where the catalyst layer is formed, which is disadvantageous for inflow of exhaust gas. In Example 1, by contrast, where the catalyst layer is formed to a thickness identical to that of the partition wall, and so as to be in contact with the inlet side cells and the outlet side cells, it is deemed that relatively wide flow channels of exhaust gas within the partition wall are secured also after formation of the catalyst layer.

(Evaluation of Exhaust Gas Purification Performance)

The purification performance of the produced exhaust gas purification catalysts was evaluated in a vehicle evaluation.

tinuously on the basis of a ratio of inlet gas concentration and outlet gas concentration at this time, and the catalyst inlet gas temperature ($T_{50}\text{-}NO_x$) at a time where the purification rate of the $NO_x$ component reached 50% was evaluated. The $NO_x$ purification rate in each example was worked out as the reciprocal of a relative value with respect to $T_{50}\text{-}NO_x$ (100%) in Comparative example 1. Results are given in the corresponding column of Table 1. A higher $NO_x$ purification rate indicates that the corresponding catalyst exhibits a better $NO_x$ purification performance.

Figure 5:
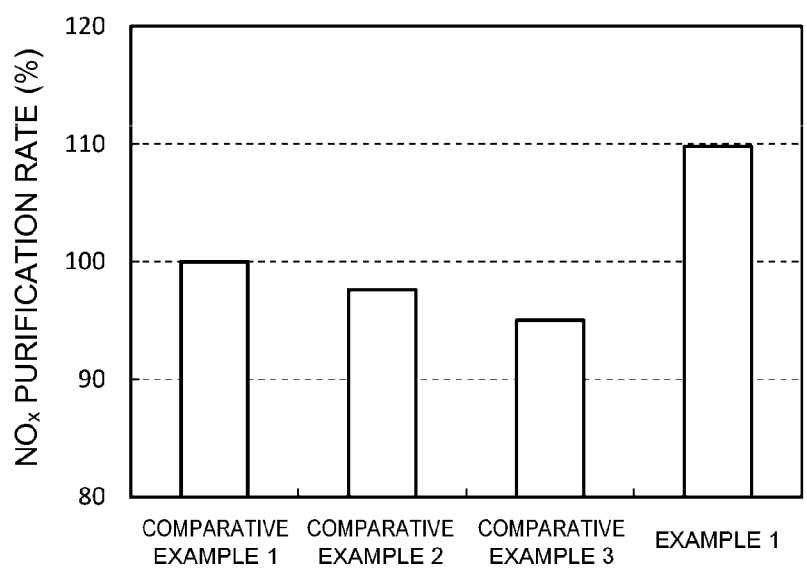
FIG. 5 is a graph of a comparison of $NO_x$ purification rates of Comparative examples 1 to 3 and Example 1.

FIG. 5 is a graph of a comparison of $NO_x$ purification rates of Comparative examples 1 to 3 and Example 1. As Table 1 and FIG. 5 reveal, the $NO_x$ purification rate in Example 1 was dramatically higher than in Comparative examples 1 to 3. A conceivable underlying reason for this is that the contact frequency of exhaust gas with the catalyst layer was relatively lower in Comparative example 1. In Comparative examples 2 and 3, the oxidation catalyst and the reduction catalyst are disposed throughout the interior of the partition wall, and it is deemed that as a result grain growth and alloying occur in the metal catalyst, and the contact frequency of exhaust gas with the metal catalyst decreases. In Example 1, by contrast, the oxidation catalyst and the reduction catalyst are disposed separately in the extension direction of the partition wall, and it is deemed that the contact frequency of exhaust gas with the metal catalyst increases as a result.

Test Example I-2

Exhaust gas purification catalysts of Examples 2 to 4 were produced in the same way as in Example 1, but herein the lengths ($L_{1\text{-}in}$, $L_{1\text{-}out}$, $L_{2\text{-}in}$, $L_{2\text{-}out}$) of the first catalyst layer and the second catalyst layer in the extension direction of the partition wall were modified as given in Table 2. Exhaust gas purification performance was evaluated in the same way as in Test example I-1. Results are given in the corresponding column in Table 2. Table 2 sets out relative values with respect to the $NO_x$ purification rate of Comparative example 1 (100%).

TABLE 2

| | First catalyst layer | | | | | Second catalyst layer | | | | | NO$_x$ purification rate (%)*3 |
|---|---|---|---|---|---|---|---|---|---|---|---|
| | Catalyst metal species | L$_{1-in}$ (%)*1 | L$_{1-out}$ (%)*1 | Coating amount (g) | Maximum thickness (%)*2 | Catalyst metal species | L$_{2-in}$ (%)*1 | L$_{2-out}$ (%)*1 | Coating amount (g) | Maximum thickness (%)*2 | |
| Example 1 | Rh | 70 | 60 | 60.2 | 100 | Pd | 30 | 40 | 28.3 | 100 | 109.8 |
| Example 2 | | 75 | 65 | | | | 25 | 35 | | | 110.5 |
| Example 3 | | 60 | 50 | | | | 40 | 50 | | | 109.3 |
| Example 4 | | 50 | 40 | | | | 50 | 60 | | | 109.3 |

*1Relative value with respect to L$_w$ as 100%.
*2Relative value with respect to T$_w$ as 100%.
*3Relative value with respect to the result of Comparative example 1 as 100%.

Figure 6:
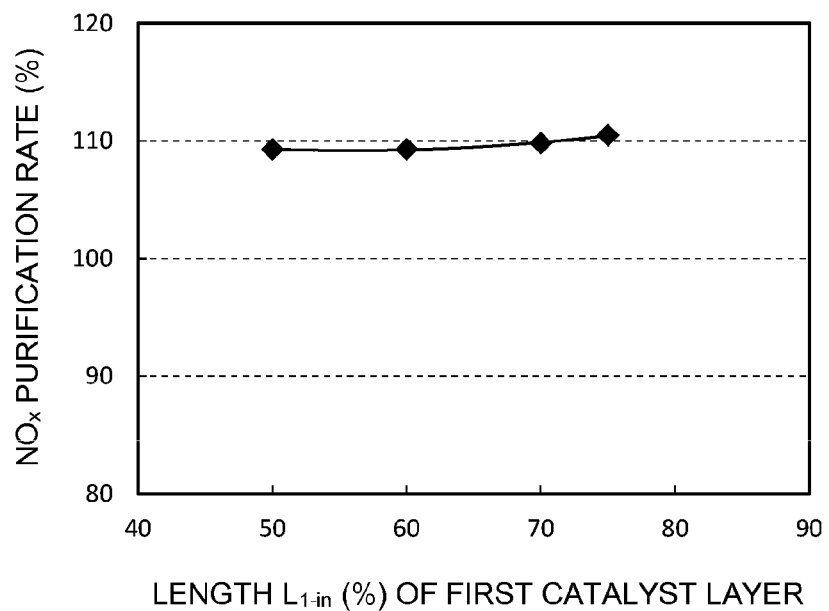
FIG. 6 is a graph illustrating a relationship between the length of a first catalyst layer in the extension direction and $NO_x$ purification rate.

FIG. 6 is a graph illustrating a relationship between the length of the first catalyst layer in the extension direction and NO$_x$ purification rate. As Table 2 and FIG. 6 indicate, the NO$_x$ purification rates in Examples 1 to 4 were substantially the same, and all were about 10% higher than that in Comparative example 1. From the viewpoint of NO$_x$ purification performance, therefore, it is considered that the length L$_{1-in}$ of the first catalyst layer in the extension direction may be 50% to 75% with respect to 100% as the total length L$_w$ of the partition wall in the extension direction, on the surface of the partition wall on the side in contact with the inlet side cells.

Test Example II

An exhaust gas purification catalyst of Example 5 was produced by reversing the first catalyst layer and the second catalyst layer of Example 1. Pressure loss and exhaust gas purification performance were evaluated in the same way as in Test example I-1. Instead of the purification rate of the NO$_x$ component, herein the purification rate of a HC component (HC purification rate) was evaluated according to Test example I-1 above. Results are given in the corresponding column in Table 3. Table 3 sets out relative values with respect to the HC purification rate of Comparative example 1 (100%). A higher HC purification rate indicates that the corresponding catalyst exhibits a better HC purification performance.

From the viewpoint of HC purification performance, therefore, it is considered that the oxidation catalyst is preferably disposed in the first catalyst layer.

Concrete examples of the invention have been explained in detail above, but these examples are merely illustrative in nature, and are not meant to limit the scope of the claims. The art set forth in the claims encompasses various alterations and modifications of the concrete examples illustrated above.

In the embodiment described above, for instance, the GPF 10 is further provided with the third catalyst layer 40, in addition to the first catalyst layer 20 and the second catalyst layer 30, but the GPF 10 is not limited thereto. For instance the GPF 10 may have just two catalyst layers, i.e. the first catalyst layer 20 and the second catalyst layer 30.

In the embodiment described above, for instance, the exhaust gas purification catalyst gas is the GPF 10, but is not limited thereto. In a case for instance where the internal combustion engine 2 is a diesel engine, the exhaust gas purification catalyst may be a diesel particulate filter (DPF).

REFERENCE SIGNS LIST

1 Exhaust gas purification device
2 Internal combustion engine
10 GPF (exhaust gas purification catalyst)
11 Substrate
12 Inlet cell

TABLE 3

| | First catalyst layer (inlet catalyst layer in Comparative example 3) | | | | | Second catalyst layer (outlet catalyst layer in Comparative example 3) | | | | | Increase rate of pressure loss (%)*3 | HC purification rate (%)*3 |
|---|---|---|---|---|---|---|---|---|---|---|---|---|
| | Catalyst metal species | L$_{1-in}$ (%)*1 | L$_{1-out}$ (%)*1 | Coating amount (g) | Maximum thickness (%)*2 | Catalyst metal species | L$_{2-in}$ (%)*1 | L$_{2-out}$ (%)*1 | Coating amount (g) | Maximum thickness (%)*2 | | |
| Comparative example 1 | Rh, Pd | | 100 | 88.5 | 50 | | | | — | | 100 | 100 |
| Comparative example 2 | Rh, Pd | | 100 | 88.5 | 100 | | | | — | | 54.7 | 98.4 |
| Example 1 | Rh | 70 | 60 | 60.2 | 100 | Pd | 30 | 40 | 28.3 | 100 | 50.2 | 109.5 |
| Example 5 | Pd | 40 | 30 | 28.3 | 100 | Rh | 60 | 70 | 60.2 | 100 | 46.5 | 113 |

*1Relative value with respect to L$_w$ as 100%.
*2Relative value with respect to T$_w$ as 100%.
*3Relative value with respect to the result of Comparative example 1 as 100%.

Figure 7:
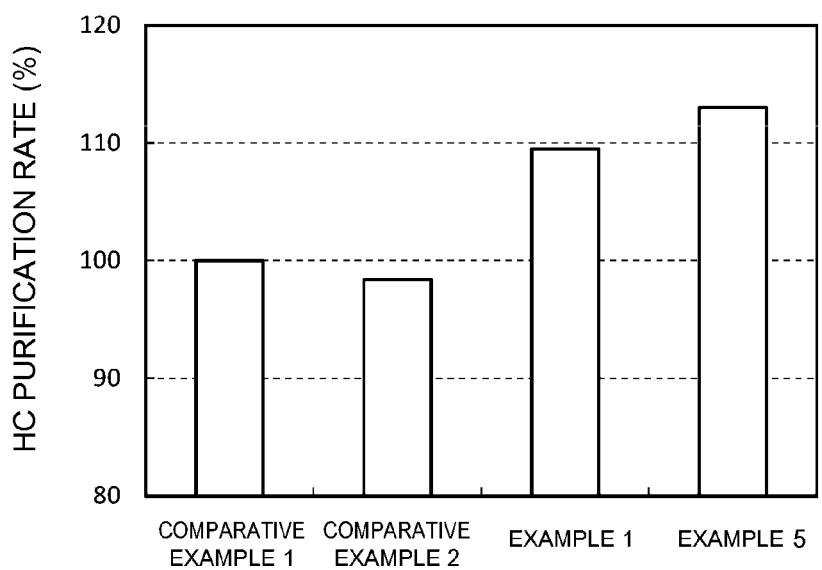
FIG. 7 is a graph of a comparison of the HC purification rates of Comparative examples 1 and 2, as well as Example 1 and Example 5.

FIG. 7 is a graph of a comparison of the HC purification rates of Comparative examples 1 and 2, as well as Example 1 and Example 5. As Table 3 and FIG. 7 reveal, the HC purification rate in Example 5 was better than in Example 1.

14 Outlet cell
16 Partition wall
20 First catalyst layer
30 Second catalyst layer

The invention claimed is:

1. An exhaust gas purification catalyst which is disposed in an exhaust passage of an internal combustion engine and which purifies exhaust gas emitted by the internal combustion engine, the catalyst comprising:
   a base of a wall flow structure having an inlet side cell in which an end on an exhaust gas inflow side is open, an outlet side cell in which an end on an exhaust gas outflow side is open, and a porous partition wall that partitions the inlet side cell and the outlet side cell; and;
   a first catalyst layer disposed in the interior of the porous partition wall, along an extension direction of the porous partition wall from the end on the exhaust gas inflow side, so as to be in contact with the inlet side cell and the outlet side cell; and
   a second catalyst layer disposed in the interior of the porous partition wall, along the extension direction of the porous partition wall from the end on the exhaust gas outflow side, so as to be in contact with the inlet side cell and the outlet side cell,
   wherein either one of the first catalyst layer and the second catalyst layer contains an oxidation catalyst but does not contain a reduction catalyst, and the other one contains a reduction catalyst but does not contain an oxidation catalyst; and
   a ratio of the lengths of the first catalyst layer and the second catalyst layer differs between a surface of the porous partition wall on the side in contact with the inlet side cell and a surface of the porous partition wall on the side in contact with the outlet side cell.

2. The exhaust gas purification catalyst of claim 1, wherein
   the first catalyst layer contains a reduction catalyst but does not contain an oxidation catalyst, and the second catalyst layer contains an oxidation catalyst but does not contain a reduction catalyst.

3. The exhaust gas purification catalyst of claim 1, wherein
   the first catalyst layer contains an oxidation catalyst but does not contain a reduction catalyst, and the second catalyst layer contains a reduction catalyst but does not contain an oxidation catalyst.

4. The exhaust gas purification catalyst of claim 1, wherein
   taking a total length of the porous partition wall in the extension direction thereof as 100%, the first catalyst layer is disposed, on a surface of the porous partition wall on the side in contact with the inlet side cell, over a length of 40% to 75% of the total length of the porous partition wall.

5. The exhaust gas purification catalyst of claim 1, wherein
   taking a total length of the porous partition wall in the extension direction thereof as 100%, the second catalyst layer is disposed, on a surface of the porous partition wall on the side in contact with the outlet side cell, over a length of 35% to 70% of the total length of the porous partition wall.

6. The exhaust gas purification catalyst of claim 1, wherein
   the whole surface of the porous partition wall on the side in contact with the inlet side cell and the whole surface of the porous partition wall on the side in contact with the outlet side cell are each covered with at least either one of the first catalyst layer and the second catalyst layer.

7. The exhaust gas purification catalyst of claim 1, wherein
   the first catalyst layer is disposed so that the length thereof in the extension direction of the porous partition wall decreases gradually from the surface of the porous partition wall on the side in contact with the inlet side cell towards the surface of the porous partition wall on the side in contact with the outlet side cell; and
   the second catalyst layer is disposed so that the length thereof in the extension direction of the porous partition wall increases gradually from the surface of the porous partition wall on the side in contact with the inlet side cell towards the surface of the porous partition wall on the side in contact with the outlet side cell.

8. The exhaust gas purification catalyst of claim 1, wherein
   the internal combustion engine is a gasoline engine.

* * * * *